(12) United States Patent
Ishikawa et al.

(10) Patent No.: US 12,405,783 B2
(45) Date of Patent: Sep. 2, 2025

(54) SOFTWARE UPDATE APPARATUS, MASTER, OTA MASTER, AND NETWORK SYSTEM

(71) Applicant: TOYOTA JIDOSHA KABUSHIKI KAISHA, Toyota (JP)

(72) Inventors: Tomoyasu Ishikawa, Nagoya (JP); Yusuke Satoh, Nisshin (JP); Satoru Fukuyo, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/342,906

(22) Filed: Jun. 9, 2021

(65) Prior Publication Data

US 2021/0397443 A1 Dec. 23, 2021

(30) Foreign Application Priority Data

Jun. 18, 2020 (JP) ................................. 2020-105410

(51) Int. Cl.
  *G06F 8/658* (2018.01)
  *G06F 8/656* (2018.01)
  *H04L 41/082* (2022.01)

(52) U.S. Cl.
  CPC .............. *G06F 8/658* (2018.02); *G06F 8/656* (2018.02); *H04L 41/082* (2013.01)

(58) Field of Classification Search
  CPC ......... G06F 8/658; G06F 8/656; H04L 41/082
  See application file for complete search history.

(56) References Cited

U.S. PATENT DOCUMENTS

| 11,029,935 | B2* | 6/2021 | Nakamura | .............. G06F 1/329 |
| 2014/0052330 | A1* | 2/2014 | Mitchell | ................... G06F 8/65 |
| | | | | 701/31.5 |
| 2015/0052176 | A1* | 2/2015 | Akaike | ................. G06F 16/172 |
| | | | | 707/812 |
| 2016/0246510 | A1* | 8/2016 | Rothman | .............. G06F 3/0655 |
| 2016/0306624 | A1* | 10/2016 | Vangelov | ................ H04L 67/12 |

(Continued)

FOREIGN PATENT DOCUMENTS

| CN | 107872511 A | 4/2018 |
| CN | 109643253 A | 4/2019 |

(Continued)

*Primary Examiner* — Qing Chen
*Assistant Examiner* — Amir Soltanzadeh
(74) *Attorney, Agent, or Firm* — Oblon, McClelland, Maier &Neustadt, L.L.P.

(57) ABSTRACT

A master includes: a communication module configured to request a download of update data from a center; a first storage device configured to store the update data obtained by the download; and one or more processors configured to at a time of execution of the download, check at least one of a free space size of the first storage device or a free space size of a second storage device of each of one or more update-target in-vehicle devices among a plurality of in-vehicle devices connected through an in-vehicle network, and perform control such that, based on the update data, update software is installed, or installed and activated, in the one or more update-target in-vehicle devices, wherein the communication module is configured to request the download of the update data from the center based on the free space size.

13 Claims, 2 Drawing Sheets

(56) References Cited

U.S. PATENT DOCUMENTS

| | | | |
|---|---|---|---|
| 2017/0090901 A1 | 3/2017 | Bainville et al. | |
| 2018/0032324 A1* | 2/2018 | Sarkar | G06F 8/65 |
| 2018/0101330 A1* | 4/2018 | Yoon | G06F 3/0679 |
| 2018/0349129 A1* | 12/2018 | Ju | G06F 8/654 |
| 2019/0193653 A1* | 6/2019 | Nakamura | G06F 9/4893 |
| 2019/0258471 A1* | 8/2019 | Hirota | G06F 8/65 |
| 2020/0065087 A1* | 2/2020 | Miura | H04L 67/34 |
| 2020/0264864 A1* | 8/2020 | Yang | H04L 9/30 |
| 2020/0349133 A1* | 11/2020 | Dwarampudi | G06F 16/219 |
| 2020/0387362 A1* | 12/2020 | Tsuboi | G06F 8/71 |
| 2021/0155176 A1 | 5/2021 | Harata et al. | |
| 2021/0157529 A1 | 5/2021 | Sakurai et al. | |
| 2021/0157566 A1 | 5/2021 | Sakurai et al. | |
| 2021/0157567 A1 | 5/2021 | Sakurai et al. | |
| 2021/0157568 A1 | 5/2021 | Sakurai et al. | |
| 2021/0157571 A1 | 5/2021 | Ogawa et al. | |
| 2021/0157572 A1 | 5/2021 | Harata et al. | |
| 2021/0157575 A1 | 5/2021 | Ogawa et al. | |
| 2021/0157902 A1 | 5/2021 | Sakurai et al. | |
| 2022/0156057 A1* | 5/2022 | Kobayashi | G06F 8/65 |

FOREIGN PATENT DOCUMENTS

| | | |
|---|---|---|
| JP | 2011-148398 A | 8/2011 |
| JP | 2016-71527 A | 5/2016 |
| JP | 2019-074800 A | 5/2019 |
| JP | 2020-27627 A | 2/2020 |
| JP | 2020-027628 A | 2/2020 |

* cited by examiner

SOFTWARE UPDATE APPARATUS, MASTER, OTA MASTER, AND NETWORK SYSTEM

CROSS-REFERENCE TO RELATED APPLICATION

This application claims priority to Japanese Patent Application No. 2020-105410 filed on Jun. 18, 2020, incorporated herein by reference in its entirety.

BACKGROUND OF THE INVENTION

1. Field of the Invention

The present disclosure relates to a software update apparatus, a master, an OTA master, and a network system.

2. Description of Related Art

A vehicle is equipped with a network system configured in such a manner that a plurality of in-vehicle devices called ECU (Electronic Control Unit) are connected to each other through a communication line. Each in-vehicle device performs a share of functions of the vehicle by transmitting and receiving massages among the in-vehicle devices.

Each in-vehicle device includes, typically, a processor, a transitory storage section such as a RAM, and a non-volatile storage section such as a flash ROM. A program (software) to be executed by the processor is stored in the non-volatile storage section. Functionality of each in-vehicle device can be enhanced or improved by rewriting and updating the program with a newer version.

A program update involves a step of download to receive update data from an external apparatus (center) through wireless communication or the like, and a step of installation to write an update program (update software) into a storage section of an in-vehicle device, based on the downloaded update data. For the installation, overwrite installation or other-bank installation is used, depending on specifications of an in-vehicle device. Specifically, in the overwrite installation, a downloaded update program is written on one area (single bank) defined as a program storage area in a storage area of the storage section such that the existing program (old program) is overwritten. In the other-bank installation, a downloaded update program is written on an area (the other bank) that is not an area (one bank) in which the existing program (old program) is stored, of two areas (dual bank) defined as program storage areas.

For a step of a program update in a case of the other-bank installation, in addition to the steps of download and installation, another step of activation is conducted in which setting values such as a start address of the update program are configured such that the installed update program becomes executable.

With reference to an ECU program update, Japanese Patent Application Publication No. 2011-148398 discloses that a specified ECU functions as a master ECU, performs communication with a server, and updates programs for the master ECU itself and another slave ECU.

SUMMARY OF THE INVENTION

The download and the install are controlled by a software update apparatus included in the network system. For example, the software update apparatus collectively downloads respective update programs for a plurality of in-vehicle devices from the external apparatus, and temporarily stores the update programs in a storage section included in the software update apparatus. Thereafter, the software update apparatus transmits the update programs to the in-vehicle devices, respectively, and causes each in-vehicle device to install, or further activate, the update program. It is conceivable that the storage section is shared with other in-vehicle devices and is used to store various data. Since an area available for further storage, such as a free space in the storage section, changes with an amount of currently stored various data, there is a possibility that the update programs cannot be collectively downloaded and stored when the area available for storage is small.

The present disclosure provides a software update apparatus or the like that can preferably update a program, according to an available storage size of the software update apparatus or the like.

A master according to an aspect of the present disclosure includes: a communication module configured to request a download of update data from a center; a first storage section configured to store the update data obtained by the download; and one or more processors configured to at a time of execution of the download, check at least one of a free space size of the first storage section or a free space size of a second storage section of each of one or more update-target in-vehicle devices among a plurality of in-vehicle devices connected through an in-vehicle network, and perform control such that, based on the update data, update software is installed, or installed and activated, in the one or more update-target in-vehicle devices, wherein the communication module is configured to request the download of the update data from the center based on the free space size.

According to the technology of the present disclosure, the software update apparatus or the like can receive, from the center, update data that is generated such that the software update apparatus or the like does not become short of a storage area, and accordingly can preferably perform a program update for an in-vehicle device.

BRIEF DESCRIPTION OF THE DRAWINGS

Features, advantages, and technical and industrial significance of exemplary embodiments of the invention will be described below with reference to the accompanying drawings, in which like signs denote like elements, and wherein.

DETAILED DESCRIPTION OF EMBODIMENTS

Configuration

Figure 1:
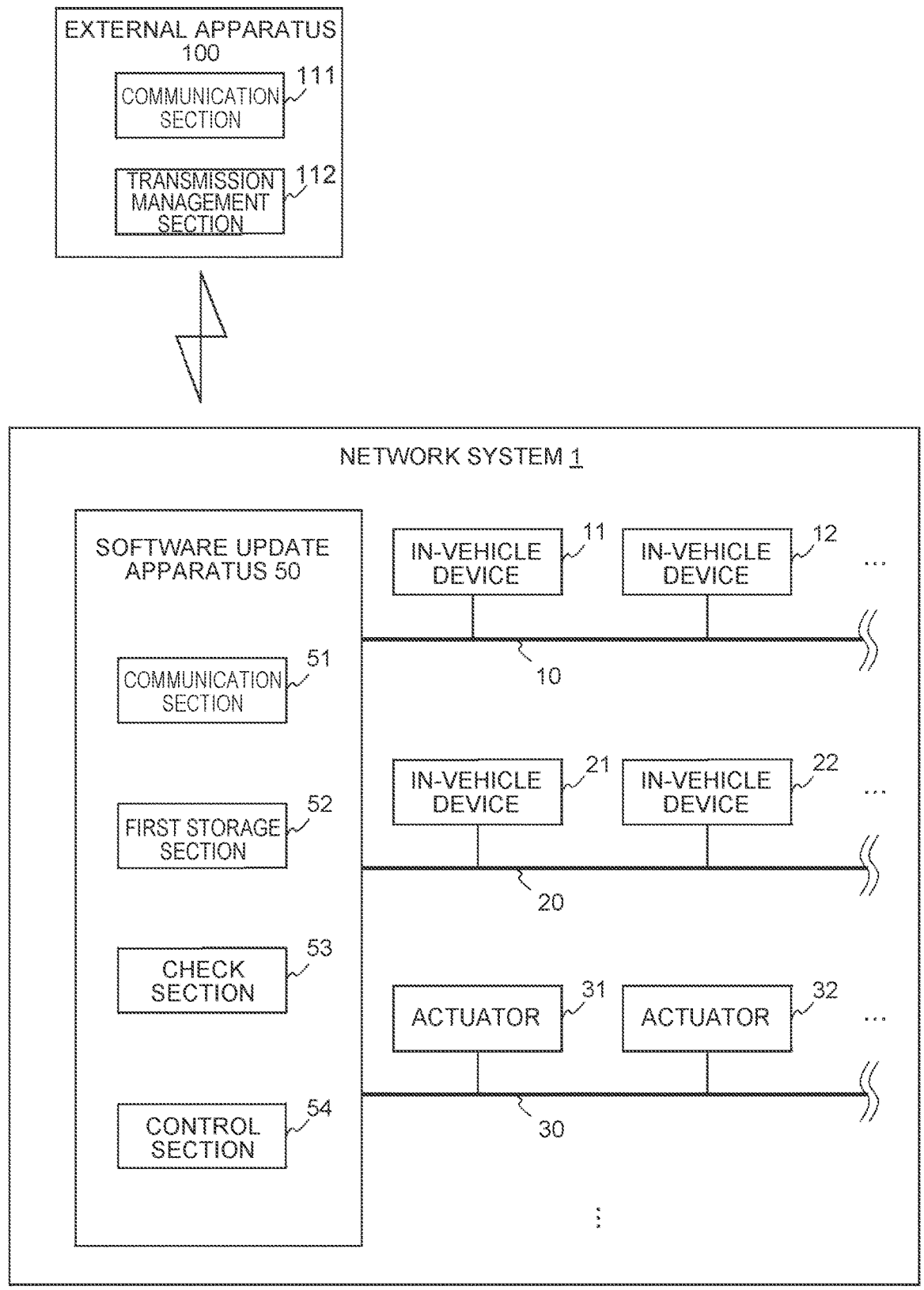
FIG. 1 is a configuration diagram of a network system according to an embodiment.

FIG. 1 shows an example of a configuration of a network system 1 according to an embodiment. The network system 1 is mounted in a vehicle. The network system 1 includes a software update apparatus 50. A plurality of buses 10, 20, 30, . . . are connected to the software update apparatus (that is also referred as an Over-The-Air (OTA) master) 50. A plurality of in-vehicle devices (electronic control units) 11, 12, . . . are connected to the bus 10. A plurality of in-vehicle devices 21, 22, . . . are connected to the bus 20. A plurality of actuators 31, 32, . . . are connected to the bus 30. Although a description in FIG. 1 and the following illustrates buses with the buses 10, 20, 30, illustrates in-vehicle devices with the in-vehicle devices 11, 12, 21, 22, and illustrates actuators with the actuators 31, 32, the numbers of buses, in-vehicle devices, and actuators are not limited.

The software update apparatus 50 includes a communication section (communication module) 51 that is capable of communicating with an external apparatus (center) 100 installed outside of the vehicle, a first storage section (storage device, storage) 52 that stores various data, a check section 53 that controls and manages access to the first storage section 52 and is capable of checking a free space size of the first storage section 52, and a control section 54.

Each in-vehicle device 11, 12, 21, 22 performs various types of processing for controlling the vehicle by communicating with one another through a network. Although a depiction of a configuration of the in-vehicle devices is omitted, each in-vehicle device includes a non-volatile second storage section (storage device, storage) such as a flash ROM, a control section (one or more processors) that performs various types of processing by reading from the second storage section and executing a program (software), and a transitory storage section such as a RAM that stores part of the program or data. Note that the software update apparatus 50 also similarly stores a program for the software update apparatus 50 in the first storage section 52, and functions of the check section 53 and the control section 54 can be performed by the control section (one or more processors) reading and executing the program. In other words, each of the in-vehicle devices 11, 12, 21, 22 and the software update apparatus 50 can be implemented as a computer including a processor. The first storage section 52 can be accessed for reading and writing from the in-vehicle devices 11, 12, 21, 22, and may be used as a shared storage device.

The control section of the software update apparatus 50 performs control and relaying of communication between the external apparatus 100 and each in-vehicle device 11, 12, 21, 22, communication between the in-vehicle devices 11, 12, 21, 22, and communication between each in-vehicle device 11, 12, 21, 22 and each actuator 31, 32, through each bus 10, 20, 30. In such a manner, the software update apparatus 50 also functions as a relay apparatus that relays communication.

Each actuator 31, 32 is a device, such as a brake, an engine, or a power steering device, that causes dynamic action in the vehicle or a part of the vehicle, and operates based on an instruction from the in-vehicle devices 11, 12, 21, 22.

The control section 54 of the software update apparatus 50 can update a program stored in the second storage section of each in-vehicle device 11, 12, 21, 22. In other words, the software update apparatus 50 performs download control and installation control, or further activation control. Download is processing of receiving and storing update data (a distribution package) for updating the program for any one of the in-vehicle devices 11, 12, 21, 22 transmitted from the external apparatus 100. The download control includes not only control of execution of the download, but can also include control of a series of processing related to the download, such as determination to permit or not to permit execution of the download and verification of the update data. Installation is processing of writing an update version of the program (update software) into the storage section of the update-target in-vehicle device, based on the downloaded update data. The installation control includes not only control of execution of the installation, but can also include control of a series of processing related to the installation, such as determination to permit or not to permit execution of the installation, transfer of the update data, and verification of the update version of the program. Activation is processing of activating the installed update version of the program. The activation control includes not only control of execution of the activation, but can also include control of a series of processing related to the activation, such as determination to permit or not to permit execution of the activation and verification of a result of the execution.

In the installation control, when the update data includes an update program itself, the control section 54 can transmit the update program to an in-vehicle device. When the update data includes compressed data, difference data, or divided data of an update program, the control section 54 may generate the update program by performing decompression, patching, or the like of the update data, and may transmit the generated update program to an in-vehicle device. Alternatively, the control section 54 may transmit the update data to an in-vehicle device, and the in-vehicle device may generate the update program by performing decompression, patching, or the like of the update data.

The installation, which is to write the update program into the second storage section of an in-vehicle device, may be executed by the control section 54, may be executed by the in-vehicle device at an instruction from the control section 54, or may be autonomously performed by the in-vehicle device that has received the update data (or the update program) even without an explicit instruction from the control section 54.

The activation, which is to activate the installed update program, may be executed by the control section 54, may be executed by the in-vehicle device at an instruction from the control section 54, or may be autonomously performed by the in-vehicle device subsequent to the installation even without an explicit instruction from the control section 54.

Note that such program update processing can be performed consecutively, or in parallel, for each of a plurality of in-vehicle devices. Update data is data used to generate an update program, and a content and a format of update data are not limited. Examples of update data includes an update program itself, difference data for generating the update program, or compressed data, divided data, or the like of the update program or the difference data. Moreover, update data may include an identifier (ECU ID) of a program update-target in-vehicle device (target electronic control unit) or an identifier (WCU Software ID) of a version of the program before an update.

The external apparatus 100 is a computer apparatus such as a server installed at a specific center or the like, as an example. The external apparatus 100 includes a communication section 111 that communicates with the software update apparatus 50, and a transmission management section (control section) 112 that manages the communication section 111. Moreover, the external apparatus 100 includes a storage section (not shown), and can externally receive data for updating the respective programs for the plurality of in-vehicle devices and store the data in the storage section.

Processing Example 1

Figure 2:
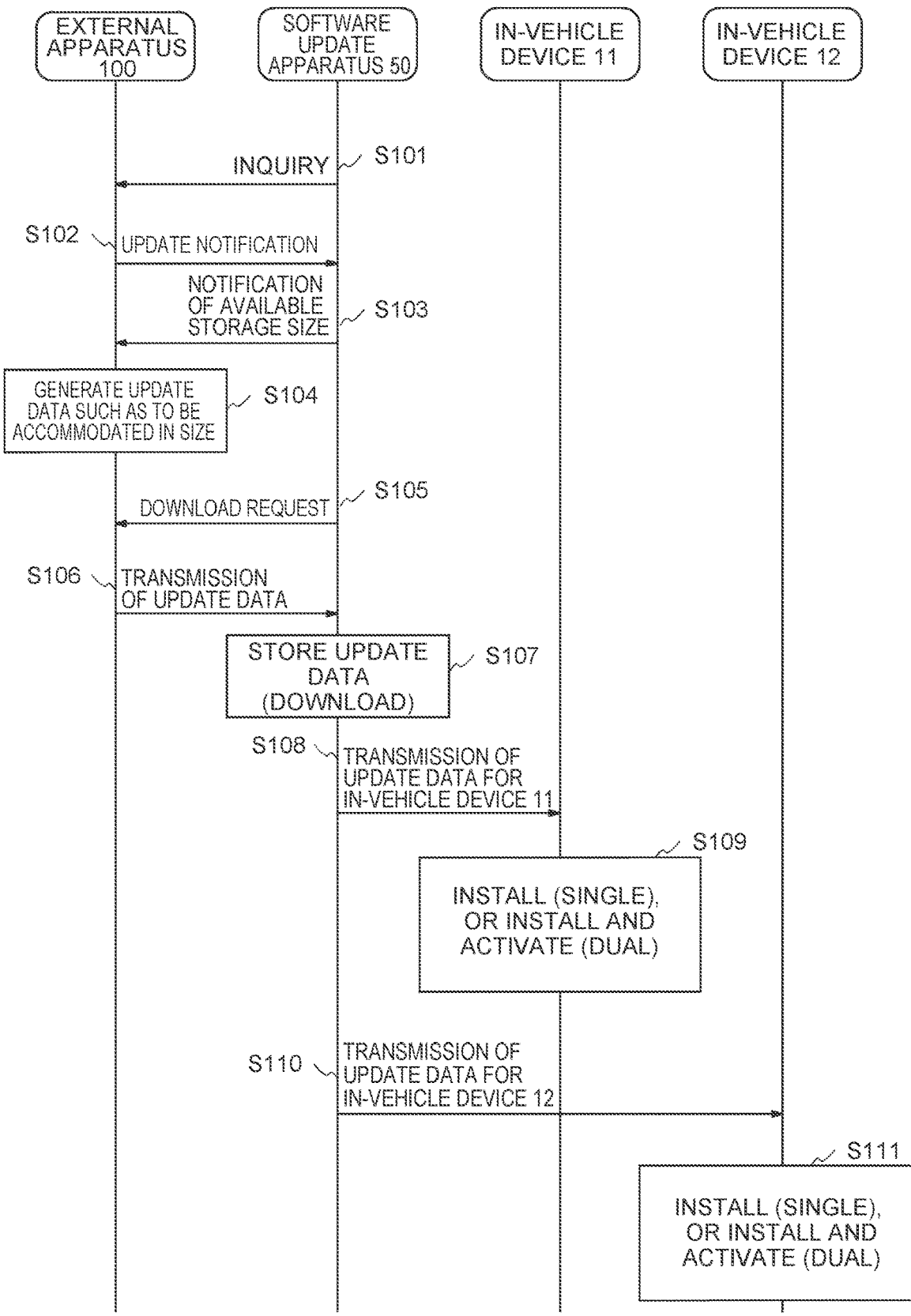
FIG. 2 is a sequence chart showing processing according to the embodiment.

Hereinafter, an example of processing according to the present embodiment will be described. FIG. 2 depicts a sequence chart showing the example of the processing. First, an example of processing will be shown that is performed according to a size of an available storage area in the first storage section 52 of the software update apparatus 50.

(Step S101) The control section 54 of the software update apparatus 50 controls the communication section 51 such that an inquiry about presence of an update program is transmitted to the external apparatus 100. The inquiry may be made, for example, periodically, or at a timing when a predetermined operation, such as turning on a power supply to the vehicle (turning ignition on, powering on), is performed.

(Step S102) When the communication section 111 of the external apparatus 100 receives the inquiry, the transmission management section 112 controls the communication section 111 such that an update notification indicating that there is an update is transmitted to the software update apparatus 50 when an update program is present. The transmission management section 112 can determine presence of each of update programs, which are update versions of the programs for the plurality of in-vehicle devices included in the network system 1, based on, for example, information indicating types of the in-vehicle devices or current versions of the programs. Such information may be stored in the external apparatus 100 beforehand, or may be received from the software update apparatus 50 along with the inquiry. Note that when an update program is absent, the transmission management section 112 controls the communication section 111 such that a no-update notification indicating that there is no update is transmitted to the software update apparatus 50.

(Step S103) When the communication section 51 of the software update apparatus 50 receives the update notification, the control section 54 acquires an available storage size of the first storage section 52 from the check section 53, and controls the communication section 51 such that the available storage size is notified to the external apparatus 100. When the communication section 51 receives the no-update notification, the processing is terminated. Note that the available storage size corresponds to a size of data that the first storage section 52 can store without affecting processing in the software update apparatus 50, and is typically a size of a free area.

(Step S104) When the communication section 111 of the external apparatus 100 receives the available storage size, the transmission management section 112 generates update data for updating the program for an in-vehicle device. In other words, the update data includes data for updating the program for each of one or more in-vehicle devices. For example, the transmission management section 112 generates the update data by compressing an update program for each of the one or more program update-target in-vehicle devices (target electronic control units), or difference data used to generate each update program (update data for each in-vehicle device), with a compression ratio adjusted such that a total size becomes the available storage size or smaller. When a series of data, even if uncompressed, has a size equal to or smaller than the available storage size of the first storage section 52, the external apparatus 100 does not need to compress the data. Hereinafter, a package of data for updating the program or programs for one or more in-vehicle devices will be referred simply as update data, and data, included in the update data, for updating the program for one in-vehicle device will be referred to as update data for the in-vehicle device.

(Step S105) The control section 54 of the software update apparatus 50 controls the communication section 51 such that a download request indicating a request to transmit update data is transmitted to the external apparatus 100. The download request may be transmitted by being included in the notification of the available storage size, or may be transmitted subsequent to the notification of the available storage size in step S103. The processing in step S104 at the external apparatus 100 may be performed after the download request.

(Step S106) The transmission management section 112 of the external apparatus 100 controls the communication section 111 such that the update data, as one unit of transmission, is transmitted to the software update apparatus 50.

(Step S107) When the communication section 51 of the software update apparatus 50 receives the update data, the check section 53 stores the update data in the free area of the first storage section 52 (download).

(Step S108) The control section 54 of the software update apparatus 50 reads the update data from the first storage section 52, and generates update data for each program update-target in-vehicle device. For example, the control section 54 decompresses the update data read from the first storage section 52, and divides the decompressed update data into update data for each in-vehicle device. Moreover, the control section 54 controls the communication section 51 such that the update data for an in-vehicle device is transmitted to the update-target in-vehicle device. In the present step, as an example, the in-vehicle device 11 is among the program update-target in-vehicle devices, and the control section 54 transmits the update data for the in-vehicle device 11 to the in-vehicle device 11.

(Step S109) When the in-vehicle device 11 receives the update data for the in-vehicle device 11, the in-vehicle device 11 updates the program to be executed by the in-vehicle device 11, based on the received update data. In other words, when the in-vehicle device 11 is of the single bank type, the in-vehicle device 11 performs the overwrite installation. When the in-vehicle device 11 is of the dual-bank type, the in-vehicle device 11 performs the other-bank installation and the activation, in the same order as mentioned.

(Step S110) When any update data, of the divided update data, for an in-vehicle device remains untransmitted, the control section 54 of the software update apparatus 50 controls the communication section 51 such that the update data for the in-vehicle device is transmitted to the update-target in-vehicle device. In the present step, as an example, the in-vehicle device 12 is among the program update-target in-vehicle devices, and the control section 54 transmits the update data for the in-vehicle device 12 to the in-vehicle device 12.

(Step S111) When the in-vehicle device 12 receives the update data for the in-vehicle device 12, the in-vehicle device 12, similarly to the in-vehicle device 11 in step S109, performs the overwrite installation, or the other-bank installation and the activation, of the program to be executed by the in-vehicle device 12, based on the received update data.

The example above is an example in a case where the update data received from the external apparatus 100 includes the update data for the in-vehicle devices 11, 12, and the programs for the in-vehicle devices 11, 12 are updated. However, program updates for other in-vehicle devices can be similarly performed. The number of update-target in-vehicle devices is not limited to two, and may be one, or three or more.

As described above, the external apparatus 100 changes the compression ratio of update data such that the update data is accommodated within the available storage size of the first storage section 52 of the software update apparatus 50, whereby the software update apparatus 50 is able to reliably store the update data in the first storage section 52. Since the external apparatus 100 performs data compression processing, according to the available storage size of the first storage section 52 of the software update apparatus 50, by using such a compression ratio that the update data has a size equal to or smaller than the available storage size, the compression ratio can be restrained from being made higher than necessary, and a load of the data compression processing by the external apparatus 100 can be reduced to an extent possible.

In step S104, when a size of the update data in one unit cannot be made equal to or smaller than the available storage size even by using a higher compression ratio, the update data may be generated in a plurality of units, each with a size equal to or smaller than the available storage size. For example, when update-target in-vehicle devices are the in-vehicle devices 11, 12, 21, 22, and when a total amount of data for updating the programs for the in-vehicle devices is so large that a size of the update data cannot be made equal to or smaller than the available storage size even by using a maximum compression ratio, update data for the in-vehicle devices 11, 12 and update data for the in-vehicle devices 21, 22 may be generated as units of transmission, respectively. In such a case, processing from transmission of the update data until execution of an update of the program in each in-vehicle device, as in steps S106 to S111, is repeated as many times as the number of the generated units of transmission. Note that when the external apparatus 100 generates update data in a plurality of units of transmission as described above, requirement for compression of the update data in each unit, and a compression ratio used when compression is required, can be set individually for each unit such that a size of the update data in the unit becomes equal to or smaller than the available storage size of the first storage section 52. In step S103, the control section 54 of the software update apparatus 50 may specify which one of compression and division of update data is preferentially performed.

In step S102, when the transmission management section 112 makes an update notification, the transmission management section 112 may acquire a size attained when neither compression nor division of the update data is performed, and may transmit the size to the software update apparatus 50. In such a case, for example, in step S103, when the received size is equal to or smaller than the available storage size, the control section 54 of the software update apparatus 50 transmits a notification requesting to transmit the update data without compressing or dividing the update data, instead of notifying the available storage size, to the external apparatus 100. Moreover, in such a case, in step S104, the transmission management section 112 of the external apparatus 100 generates the update data without compressing or dividing the update data because it can be determined that the available storage size of the first storage section 52 is enough for storage even when the update data is not compressed. Thus, a processing load can be reduced since the external apparatus 100 does not need to perform processing of determining a compression ratio of data based on the available storage size, compressing the data, or the like.

In step S103, the control section 54 of the software update apparatus 50 may control the check section 53 such that the available storage size of the first storage section 52 is increased, and may notify the increased available storage size to the external apparatus 100. Thus, the external apparatus 100 can use a lower compression ratio, and a load of the data compression processing can be reduced. The available storage size can be increased, for example, in a following manner. Specifically, in the storage area of the first storage section 52, among areas secured as areas in use by the control section 54 and in-vehicle devices sharing the first storage section 52, an area that has no need, or less need, to be kept secured is released. Such processing may be performed when the control section 54 receives, from the external apparatus 100, the size attained when neither compression nor division of the update data is performed, and when the received size is larger than the current available storage size of the first storage section 52.

Processing Example 2

Next, an example of processing will be shown that is performed according to a size of an available storage area in the second storage section of an in-vehicle device that is a program update target. In the present example, the sequence chart in FIG. 2 is also referred to, and processing corresponding to the processing in the processing example 1 is denoted by the same step numbers for reference. A description of matters similar to those described in the processing example 1 will be omitted as appropriate.

(Step S101) As in the processing example 1, the control section 54 of the software update apparatus 50 controls the communication section 51 such that an inquiry about presence of an update program is transmitted to the external apparatus 100.

(Step S102) As in the processing example 1, when the communication section 111 of the external apparatus 100 receives the inquiry, the transmission management section 112 controls the communication section 111 such that an update notification is transmitted to the software update apparatus 50 when an update program is present.

(Step S103) When the communication section 51 of the software update apparatus 50 receives the update notification, the control section 54 acquires, from each in-vehicle device, an available storage size of the second storage section of the in-vehicle device, and controls the communication section 51 such that the available storage sizes are notified to the external apparatus 100. The update notification may include information specifying an update-target in-vehicle device, and the control section 54 may acquire an available storage size of each specified in-vehicle device. The control section 54 may acquire the available storage sizes by transmitting a request related to acquisition of an available storage size to each in-vehicle device or each specified in-vehicle device. Note that in the present example, the available storage size corresponds to a size of data that an in-vehicle device can store without affecting processing in the in-vehicle device, is a size that allows program update processing to be performed, and is typically a size of a free area.

(Step S104) When the communication section 111 of the external apparatus 100 receives the available storage sizes, the transmission management section 112 generates update data for updating the programs for the in-vehicle devices. For example, the transmission management section 112 generates the update data by compressing update data for each in-vehicle device with a compression ratio adjusted such that a storage area of the in-vehicle device does not become insufficient for a size of the update data for the in-vehicle device, and collecting the compressed data. Note that when the available storage size of an in-vehicle device is so large that the storage area does not become insufficient even when the update data for the in-vehicle device is not compressed, the external apparatus 100 does not need to perform compression.

(Step S105) As in the processing example 1, the control section 54 of the software update apparatus 50 controls the communication section 51 such that a download request indicating a request to transmit update data is transmitted to the external apparatus 100. The download request may be transmitted by being included in the notification of the available storage size, or may be transmitted subsequent to the notification of the available storage size in step S103. The processing in step S104 at the external apparatus 100 may be performed after the download request.

(Step S106) As in the processing example 1, the transmission management section 112 of the external apparatus 100 controls the communication section 111 such that the update data, as one unit of transmission, is transmitted to the software update apparatus 50.

(Step S107) As in the processing example 1, the check section 53 stores the update data in the free area of the first storage section 52 (download).

(Step S108) As in the processing example 1, the control section 54 of the software update apparatus 50 generates update data for each program update-target in-vehicle device, and transmits the update data for an in-vehicle device to the update-target in-vehicle device. In the present step, as an example, the control section 54 transmits the update data for the in-vehicle device 11 to the in-vehicle device 11.

(Step S109) When the in-vehicle device 11 receives the update data for the in-vehicle device 11, the in-vehicle device 11 updates the program to be executed by the in-vehicle device 11, based on the received update data. In other words, when the in-vehicle device 11 is of the single bank type, the in-vehicle device 11 performs the overwrite installation. When the in-vehicle device 11 is of the dual-bank type, the in-vehicle device 11 performs the other-bank installation and the activation, in this order. Thus, for example, the in-vehicle device 11 can perform processing of receiving the compressed update data for the in-vehicle device 11 from the software update apparatus 50, temporarily storing the received compressed update data in the free area, generating an update program by decompressing the compressed update data, and installing the update program, without shortage of a storage capacity. Accordingly, a load on the software update apparatus 50 can be reduced, compared with a case where an update program is generated on the software update apparatus 50 side.

(Step S110) As in the processing example 1, when any update data, of the divided update data, for an in-vehicle device remains untransmitted, the control section 54 of the software update apparatus 50 controls the communication section 51 such that the update data for the in-vehicle device is transmitted to the update-target in-vehicle device. In the present step, as an example, the control section 54 transmits the update data for the in-vehicle device 12 to the in-vehicle device 12.

(Step S111) When the in-vehicle device 12 receives the update data for the in-vehicle device 12, the in-vehicle device 12, similarly to the in-vehicle device 11 in step S109, performs the overwrite installation, or the other-bank installation and the activation, of the program to be executed by the in-vehicle device 12, based on the received update data.

Program updates for other in-vehicle devices can be performed in a manner similar to the above.

As described above, the external apparatus 100 changes the compression ratio of update data for each program update-target in-vehicle device such that the update data for the in-vehicle device is accommodated within an available storage size of the in-vehicle device, whereby each in-vehicle device can reliably store the update data. Since the external apparatus 100 performs data compression processing, according to the available storage size of each in-vehicle device, by using such a compression ratio that the update data for the in-vehicle device has a size equal to or smaller than the available storage size, the compression ratio can be restrained from being made higher than necessary, and a load of the data compression processing by the external apparatus 100 can be reduced to an extent possible.

In step S104, when there is an in-vehicle device for which a size of the update data in one unit cannot be made equal to or smaller than the available storage size even by using a higher compression ratio, the update data for the in-vehicle device may be divided into units, each with a size equal to or smaller than the available storage size. For example, when the update data for the in-vehicle device 11 is so large that a size of the update data for the in-vehicle device 11 cannot be made equal to or smaller than the available storage size of the in-vehicle device 11 even by using a maximum compression ratio, the update data for the in-vehicle device 11 may be divided, and the divided data may be generated as different units of transmission. In such a case, in the processing in steps S106 to S109, processing of transmitting a portion of the update data for the in-vehicle device 11, download, and installation is repeated as many times as the number of the generated units of transmission. Note that when the in-vehicle device 11 is of the dual-bank type, activation is performed after the installation is completed. As described above, division of update data for one in-vehicle device is performed by the external apparatus 100, whereby a processing load on the software update apparatus 50 can be reduced because the software update apparatus 50 does not need to perform processing of dividing the update data. In step S103, the control section 54 of the software update apparatus 50 may specify, for the update data of each in-vehicle device, which one of compression and division is preferentially performed.

Alternatively, in steps S108, S110, the control section 54 of the software update apparatus 50 may divide the update data for each program update-target in-vehicle device, regardless of a size thereof, into two or more units, and may transmit the divided update data to the corresponding update-target in-vehicle device. For example, even when the update data for the in-vehicle device 11 is equal to or smaller than the available storage size of the in-vehicle device 11, the control section 54 may divide the update data for the in-vehicle device 11 and may transmit the divided update data at a plurality of timings. Thus, communication loads on the network system 1 can be balanced, and operation can be stabilized.

In step S102, when the transmission management section 112 makes an update notification, the transmission management section 112 may acquire a size attained when the update data for each of one or more program update-target in-vehicle devices is not compressed or divided, and may transmit each size to the software update apparatus 50. In such a case, for example, in step S103, when a received size of the update data for an in-vehicle device is equal to or smaller than the available storage size of the in-vehicle device that stores the update data, the control section 54 of the software update apparatus 50 transmits a notification requesting to transmit the update data for the in-vehicle device with the notified size without compressing or dividing the update data for the in-vehicle device, instead of notifying the available storage size of the in-vehicle device, to the external apparatus 100. Moreover, in such a case, in step S104, the transmission management section 112 of the external apparatus 100 uses the update data as it is without compressing the data because it can be determined that the available storage size of the in-vehicle device is enough to store the update data even when the update data is not compressed. Thus, since the external apparatus 100 does not need to perform processing of determining a compression ratio of data based on the available storage size, compressing the data, or the like, a processing load is able to be reduced.

In step S103, the control section 54 of the software update apparatus 50 may control each in-vehicle device such that the available storage size of the second storage section of the in-vehicle device is increased, and may notify the increased available storage size to the external apparatus 100. Thus, the external apparatus 100 can use a lower compression ratio, and a load of the data compression processing can be reduced. Such processing may be performed for an in-vehicle device for which a size of the update data is larger than the current available storage size when the control section 54 receives, from the external apparatus 100, the size attained when the update data for each of one or more in-vehicle devices is not compressed or divided.

Hereinabove, the processing example 1 and the processing example 2 have been described. The processing example 1 can be preferably applied to cases where although there is a possibility that the available storage area in the software update apparatus 50 becomes insufficient, there is no possibility that the available storage area in each in-vehicle device becomes insufficient. The processing example 2 can be preferably applied to cases where there is no possibility that the available storage area in the software update apparatus 50 becomes insufficient, but there is a possibility that the available storage area in each in-vehicle device becomes insufficient. When there is a possibility that the available storage area in any of the software update apparatus 50 and each in-vehicle device becomes insufficient, the processing example 1 and the processing example 2 can be performed in combination. Specifically, a configuration may be made such that update data received by the software update apparatus 50 from the external apparatus 100 can be stored by the software update apparatus 50, and update data for each in-vehicle device received by the software update apparatus 50 from each in-vehicle device can be stored by the corresponding in-vehicle device. Moreover, a case is conceivable where a device other than the software update apparatus 50 and a software update-target in-vehicle device is used for a shared storage device and temporarily stores update data, and a similar method can be preferably applied to such a case. For example, in the processing example 1, when the other device stores update data in place of the software update apparatus 50, similar processing may be performed based on an available storage size of the other device, in place of the available storage size of the software update apparatus 50. As described above, according to the present embodiment, the external apparatus 100 can be caused to transmit update data configured, based on an available storage size of a specified in-vehicle device selected from among the plurality of in-vehicle devices included in the in-vehicle network, such that a storage area of the specified in-vehicle device does not become insufficient.

In the processing example 1, in some cases, the available storage size of the software update apparatus 50 is insufficient, so that not all of the update data for program update-target in-vehicle devices can be stored. In such a case, for example, in step S106, the transmission management section 112 of the external apparatus 100 may detect such insufficiency, may generate update data including, within an allowed size, the update data for in-vehicle devices selected in order from a higher-priority in-vehicle device, based on degrees of priority assigned to the in-vehicle devices, respectively, and may transmit the generated update data to the software update apparatus 50. A relatively high degree of priority may be assigned to, for example, an in-vehicle device related to traveling performance or safety performance. In the processing example 2, in some cases, even a program update-target in-vehicle device cannot update the program because an available storage size of the in-vehicle device is insufficient. In such a case, for example, in step S106, the transmission management section 112 of the external apparatus 100 may detect such insufficiency, may generate update data including the update data for the other in-vehicle devices without including the update data for the in-vehicle device with the insufficient available storage size, and may transmit the generated update data to the software update apparatus 50. The transmission management section 112 may generate information specifying the in-vehicle device that does not update the program because of the insufficient available storage size as described above and may notify the information to the software update apparatus 50, and the control section 54 of the software update apparatus 50 may notify a user that there is an in-vehicle device for which a program update is not performed, or may further notify the information specifying the in-vehicle device to the user. Such a notification may be omitted when the in-vehicle device for which a program update is not performed has a lower degree of priority than a predetermined degree of priority.

A limit may be imposed as appropriate on the vehicle-side processing in the individual steps, particularly the processing of transmitting update data to each in-vehicle device as in steps S108, S110 and the processing of installation and activation at each in-vehicle device as in steps S109, S111. For example, when an operation of turning off the power supply to the vehicle (turning ignition off, powering off) is performed, the control section 54 may abort the processing in order to prevent a battery from running out. Alternatively, only a predetermined in-vehicle device, or an in-vehicle device designated in the update data by the external apparatus 100, may be allowed to perform processing when the power supply is off, and processing at the other in-vehicle devices may be aborted. The control section 54 may calculate or acquire an amount of electricity required for each processing in an update and a remaining capacity of the battery as appropriate, and may allow each in-vehicle device to perform processing when it is estimated that the remaining capacity of the battery does not become equal to or less than a predetermined capacity even if processing is performed when the power supply is off. Alternatively, processing at one or some of the in-vehicle devices may be performed within a scope in which it is estimated that the remaining capacity of the battery does not become equal to or less than the predetermined capacity. When an in-vehicle device performs processing when the power supply is off, the in-vehicle device may reduce power consumption by limiting functions compared to at a time of ordinary running such as when the power supply is on, and by performing only processing required for an update such as installation and activation. When processing is performed as continuously as possible even when the power supply is off as described above, a program update is completed quickly, and convenience is enhanced.

Effects

In the present embodiment, the software update apparatus 50 can receive, from the external apparatus 100, update data generated such that a storage area of each in-vehicle device does not become insufficient, and a program update for each in-vehicle device can be preferably performed.

The technology of the present disclosure can be construed not only as the software update apparatus and the external apparatus, but also as the network system including the software update apparatus, a method performed by each of the computers included in the software update apparatus and the external apparatus, a program and a computer-readable non-transitory storage medium storing the program, a vehicle including the software update apparatus, and the like.

The technology of the present disclosure is useful for a network system mounted in a vehicle or the like.

A master according to an aspect of the present disclosure is configured to update software for a target electronic control unit that is a software update target among one or more electronic control units mounted in a vehicle. The master includes: a communication module configured to communicate with a center; and one or more processors configured to update the software for the target electronic control unit. The one or more processors is configured to acquire information related to a free space size of a storage of the target electronic control unit. The communication module is configured to transmit, to the center, information requesting a download of update data with a size equal to or smaller than the free space size of the storage of the target electronic control unit, and receive the update data from the center. The one or more processors is configured to update the software for the target electronic control unit by using the update data received by the communication module.

In the above aspect, the one or more processors may be configured to request the information related to the free space size of the storage of the target electronic control unit from at least one of the one or more electronic control units, and acquire the information related to the free space size of the storage of the target electronic control unit from the at least one of the one or more electronic control units.

In the above aspect, the update data may be data compressed or divided by the center based on the information related to the free space size of the storage of the target electronic control unit.

A network system according to another aspect of the present disclosure includes: one or more electronic control units mounted in a vehicle; and a master configured to acquire information related to a free space size of a storage of a target electronic control unit that is a software update target among the one or more electronic control units, transmit, to a center, information requesting a download of update data with a size equal to or smaller than the free space size of the storage of the target electronic control unit, receive the update data from the center, and update software for the target electronic control unit.

In the above aspect the update data may be data compressed or divided by the center based on the information related to the free space size of the storage of the target electronic control unit.

A master according to another aspect of the present disclosure includes: a communication module configured to request a download of update data from a center; a first storage device configured to store the update data obtained by the download; and one or more processors configured to at a time of execution of the download, check at least one of a free space size of the first storage device or a free space size of a second storage device of each of one or more update-target in-vehicle devices among a plurality of in-vehicle devices connected through an in-vehicle network, and perform control such that, based on the update data, update software is installed, or installed and activated, in the one or more update-target in-vehicle devices. The communication module is configured to request the download of the update data from the center based on the free space size.

An OTA master according to another aspect of the present disclosure includes: a first storage configured to store update data downloaded from a center; and one or more processors configured to execute a download of the update data, at a time of executing the download, check at least one of a free space size of the first storage or a free space size of a second storage of each of one or more target electronic control units among a plurality of electronic control units connected through an in-vehicle network, and perform control such that, based on the update data, update software is installed, or installed and activated, in the one or more target electronic control units. The one or more processors is configured to execute the download of the update data, based on the free space size.

In the above aspect, the communication module may be configured to request, from the center, the download of the update data that is configured such that a size of the update data is equal to or smaller than the free space size.

In the above aspect, the communication module may be configured to notify the free space size to the center.

In the above aspect, the communication module may be configured to cause the center to transmit the update data that is compressed such that a size of the update data is equal to or smaller than the free space size.

In the above aspect, the communication module may be configured to cause the center to divide the update data such that a size of the update data is equal to or smaller than the free space size, and sequentially transmit the update data that is divided. The one or more processors may be configured to cause the first storage device to sequentially store the update data that is sequentially transmitted.

In the above aspect, the one or more processors may be configured to cause, based on the update data stored in the first storage device, the second storage device to store update data for each of the update-target in-vehicle devices or the update software generated based on the update data.

In the above aspect, the one or more processors may be configured to divide update data for each of the one or more update-target in-vehicle devices included in the update data stored in the first storage device, or the update software generated based on the update data, and transmit the update data that is divided or the update software that is divided to the update-target in-vehicle devices, respectively.

In the above aspect, the communication module may be configured to cause the center to transmit update data for a selected one of the one or more update-target in-vehicle devices such that a size of the update data is equal to or smaller than the free space size, the selected one being selected based on a degree of priority that is assigned to each of the plurality of in-vehicle devices.

In the above aspect, the one or more processors may be configured to notify a user of information about an in-vehicle device that is not selected among the one or more update-target in-vehicle devices.

In the above aspect, the one or more processors may be configured not to notify the information when the degree of priority of the in-vehicle device that is not selected is lower than a predetermined degree of priority.

In the above aspect, the communication module may be configured to acquire an original size of the update data from the center, and when the original size of the update data that is acquired is determined to be equal to or smaller than the free space size, receive update data in the original size without notifying the free space size to the center.

In the above aspect, the one or more processors may be configured to, before 0 notifying the free space size to the center, perform processing of increasing the free space size by releasing a storage area of the first storage device.

A method according to another aspect of the present disclosure is performed by a computer of an OTA master. The method includes: at a time of execution of a download of update data from a center, checking at least one of a free space size of a first storage or a free space size of a second storage, the first storage being a storage that stores the update data obtained by the download, and the second storage being a storage of each of one or more target electronic control units among a plurality of electronic control units connected through an in-vehicle network; based on the free space size, requesting the download of the update data from the center; and performing control such that, based on the update data, update software is installed, or installed and activated, in the one or more target electronic control units.

A non-transitory storage medium according to another aspect of the present disclosure stores instructions that are executable by the computer of the OTA master and that cause the computer to execute the method according to the above aspect.

A center according to another aspect of the present disclosure transmits, to an OTA master, update data used to update software for one or more target electronic control units among a plurality of electronic control units connected to the OTA master through an in-vehicle network. The center includes: a communication module that communicates with the OTA master; and a transmission management section that transmits the update data to the OTA master, based on a download request received from the OTA master by the communication module, and at least one of a free space size of a storage of the OTA master or a free space size of a storage of each of the one or more target electronic control units.

A vehicle according to another aspect of the present disclosure includes the OTA master according to the above aspect.

What is claimed is:

1. A network system comprising:
   a center that is external to a vehicle and that stores update data; and
   a master configured to communicate with the center, wherein
   the master includes one or more first processors configured to:
      acquire a free space size of a storage of a target electronic control unit that is a software update target among one or more electronic control units mounted in the vehicle;
      acquire an original size of the update data from the center;
      notify the free space size to the center when the original size of the update data is determined to be greater than the free space size;
      proceed without notifying the free space size to the center when the original size of the update data is determined to be equal to or smaller than the free space size;
      before acquisition of the update data for updating software from the center:
         acquire an amount of power in the vehicle, and
         based on the amount of power and the free space size, control whether to execute a process for transmitting, to the center, a request requesting a download of the update data generated such that a size of the update data is equal to or smaller than the free space size; and
      update the software for the target electronic control unit by using received update data, and
   the center includes one or more second processors configured to:
      receive, from the master, the request requesting the download of the update data;
      divide the update data such that the size of the update data is equal to or smaller than the free space size; and
      transmit the divided update data to the master,
   wherein the one or more first processors are configured to:
      divide update data or update software generated based on the update data for each of a plurality of update-target in-vehicle devices included in the update data into a plurality of divided units based on forming separate groupings of the plurality of update-target in-vehicle devices, and
      transmit the update data, as compressed data, that is divided or the update software that is divided to the update-target in-vehicle devices, respectively, wherein a compression ratio is adjusted individually for each of the divided units of the update data such that a storage area of each in-vehicle device is greater than a size of each of the divided units of the compressed update data for the respective in-vehicle device.

2. The network system according to claim 1, wherein the one or more first processors is configured to:
   request the free space size of the storage of the target electronic control unit from at least one of the one or more electronic control units, and
   acquire the free space size of the storage of the target electronic control unit from the at least one of the one or more electronic control units.

3. A network system comprising:
   a center that is external to a vehicle and that stores update data; and
   a master configured to communicate with the center, wherein
   the master includes one or more first processors configured to:
      acquire a free space size of a storage of a target electronic control unit that is a software update target among one or more electronic control units mounted in the vehicle,
      before acquisition of the update data for updating software from the center:
         acquire an amount of power in the vehicle, and
         based on the amount of power and the free space size, control whether to execute a process for transmitting, to the center, a request requesting a download of the update data generated such that a size of the update data is equal to or smaller than the free space size, and
      update software for the target electronic control unit by using received update data, and
   the center includes one or more second processors configured to:
      receive, from the master, the request requesting the download of the update data;
      compress the update data such that the size of the update data is equal to or smaller than the free space size;

not compress the update data when an original size of the update data is equal to or smaller than the free space size; and transmit the compressed update data to the master, wherein the one or more first processors are configured to:

divide update data or update software generated based on the update data for each of a plurality of update-target in-vehicle devices included in the update data into a plurality of divided units based on forming separate groupings of the plurality of update-target in-vehicle devices, and transmit the update data, as compressed data, that is divided or the update software that is divided to the update-target in-vehicle devices, respectively, wherein a compression ratio is adjusted individually for each of the divided units of the update data such that a storage area of each in-vehicle device is greater than a size of each of the divided units of the compressed update data for the respective in-vehicle device.

4. The network system according to claim 1, wherein the one or more second processors is configured to sequentially transmit the divided update data, and the one or more first processors is configured to cause a first storage device to sequentially store the divided update data that is sequentially transmitted.

5. The network system according to claim 4, wherein the one or more first processors is configured to cause, based on the divided update data stored in the first storage device, a second storage device to store update data or update software generated based on the divided update data for each of one or more update-target in-vehicle devices.

6. The network system according to claim 1, wherein the one or more second processors is configured to transmit the update data for a selected one of the update-target in-vehicle devices such that the size of the update data is equal to or smaller than the free space size, the selected one being selected based on a degree of priority that is assigned to each of the plurality of in-vehicle devices including the one or more update-target in-vehicle devices.

7. The network system according to claim 6, wherein the one or more first processors is configured to notify a user of information about an in-vehicle device that is not selected among the update-target in-vehicle devices.

8. The network system according to claim 7, wherein the one or more first processors is configured not to notify the information when the degree of priority of the in-vehicle device that is not selected is lower than a predetermined degree of priority.

9. The network system according to claim 1, wherein the one or more first processors is configured to, before notifying the free space size to the center, perform processing of increasing the free space size by releasing a storage area.

10. The network system according to claim 1, wherein the amount of power includes a remaining capacity of a battery mounted in the vehicle.

11. A method performed by a center that is external to a vehicle and that stores update data, and a master configured to communicate with the center, the method comprising:

by the master:

acquiring a free space size of a storage of a target electronic control unit that is a software update target among one or more electronic control units mounted in the vehicle;

acquiring an original size of the update data from the center;

notifying the free space size to the center when the original size of the update data is determined to be greater than the free space size;

proceeding without notifying the free space size to the center when the original size of the update data is determined to be equal to or smaller than the free space size;

before acquisition of the update data for updating software from the center:

acquiring an amount of power in the vehicle, and based on the amount of power and the free space size, controlling whether to execute a process for transmitting, to the center, a request requesting a download of the update data generated such that a size of the update data is equal to or smaller than the free space size; and updating software for the target electronic control unit by using the received update data, and by the center:

receiving, from the master, the request requesting the download of the update data;

dividing the update data such that the size of the update data is equal to or smaller than the free space size; and transmitting the divided update data to the master, wherein the master is configured to:

divide update data or update software generated based on the update data for each of a plurality of update-target in-vehicle devices included in the update data into a plurality of divided units based on forming separate groupings of the plurality of update-target in-vehicle devices, and transmit the update data, as compressed data, that is divided or the update software that is divided to the update-target in-vehicle devices, respectively, wherein a compression ratio is adjusted individually for each of the divided units of the update data such that a storage area of each in-vehicle device is greater than a size of each of the divided units of the compressed update data for the respective in-vehicle device.

12. A method performed by a center that is external to a vehicle and that stores update data, and a master configured to communicate with the center, the method comprising:

by the master:

acquiring a free space size of a storage of a target electronic control unit that is a software update target among one or more electronic control units mounted in the vehicle;

before acquisition of the update data for updating software from the center:

acquiring an amount of power in the vehicle, and based on the amount of power and the free space size, controlling whether to execute a process for transmitting, to the center, a request requesting a download of the update data generated such that a size of the update data is equal to or smaller than the free space size; and updating software for the target electronic control unit by using the received update data, and by the center receiving, from the master, the request requesting the download of the update data;

compressing the update data such that the size of the update data is equal to or smaller than the free space size;

not compressing the update data when an original size of the update data is equal to or smaller than the free space; and transmitting the compressed update data to the master, wherein the master is configured to:

divide update data or update software generated based on the update data for each of a plurality of update-target in-vehicle devices included in the update data into a plurality of divided units based on forming separate groupings of the plurality of update-target in-vehicle devices, and transmit the update data, as compressed data, that is divided or the update software that is divided to the update-target in-vehicle devices, respectively, wherein a compression ratio is adjusted individually for each of the divided units of the update data such that a storage area of each in-vehicle device is greater than a size of each of the divided units of the compressed update data for the respective in-vehicle device.

13. The network system according to claim 1, wherein the one or more processors calculates an amount of power required for each processing of an update for and allows all update-target in-vehicle devices to perform processing when it is estimated that the remaining amount of power does not become equal to or less than a predetermined capacity and a size of the update data is equal to or smaller than the free space size, and allows only a subset of the update-target in-vehicle devices to perform processing when it is estimated that the remaining amount of power does become equal to or less than a predetermined capacity even and a size of the update data is equal to or smaller than the free space size.

* * * * *